(12) United States Patent
Davydov et al.

(10) Patent No.: US 11,611,939 B2
(45) Date of Patent: Mar. 21, 2023

(54) TECHNIQUES FOR DETERMINING POWER OFFSETS OF A PHYSICAL DOWNLINK SHARED CHANNEL

(71) Applicant: Apple Inc., Cupertino, CA (US)

(72) Inventors: Alexei Davydov, Nihzny Novgorod (RU); Vadim Sergeyev, Nizhny Novgorod (RU); Gregory V. Morozov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/567,820

(22) PCT Filed: Sep. 25, 2015

(86) PCT No.: PCT/US2015/052202
§ 371 (c)(1),
(2) Date: Oct. 19, 2017

(87) PCT Pub. No.: WO2016/182593
PCT Pub. Date: Nov. 17, 2016

(65) Prior Publication Data
US 2018/0124708 A1 May 3, 2018

Related U.S. Application Data

(60) Provisional application No. 62/160,740, filed on May 13, 2015.

(51) Int. Cl.
*H04W 52/14* (2009.01)
*H04W 52/16* (2009.01)
(Continued)

(52) U.S. Cl.
CPC ......... *H04W 52/143* (2013.01); *H04W 52/16* (2013.01); *H04W 52/36* (2013.01);
(Continued)

(58) Field of Classification Search
None
See application file for complete search history.

(56) References Cited

U.S. PATENT DOCUMENTS

| 7,209,456 B2 | 4/2007 | Kwak et al. |
| 7,907,570 B2 | 3/2011 | Hwang |
(Continued)

FOREIGN PATENT DOCUMENTS

| CN | 101056457 A | 10/2017 |
| KR | 1020130048229 A | 5/2013 |
| WO | 2010070194 A1 | 3/2015 |

OTHER PUBLICATIONS

International Search Report and Written Opinion, dated Nov. 17, 2015, Application No. PCT/US2015/052202, Filed Date: Sep. 25, 2015, pp. 4.
(Continued)

*Primary Examiner* — Chirag G Shah
*Assistant Examiner* — Srinivasa R Reddivalam
(74) *Attorney, Agent, or Firm* — Eschweiler & Potashnik, LLC

(57) ABSTRACT

Examples include techniques for determining power offsets of a physical downlink shared channel (PDSCH). In some examples higher and physical layer signaling may be provided to user equipment (UE) by a base station such as an evolved Node B to enable the UE to determine power offset values for a multiplexed PDSCH having a serving PDSCH and a co-scheduled PDSCH transmitted via use of same time and frequency resources. The determined power offset values for use by the UE to demodulate the serving PDSCH and mitigate possible interference caused by the co-scheduled PDSCH. Both the UE and the eNB may operate in compliance with one or more 3rd Generation Partnership Project (3GPP) Long Term Evolution (LTE) standards.

12 Claims, 14 Drawing Sheets

(51) Int. Cl.
  *H04W 52/36* (2009.01)
  *H04W 72/04* (2009.01)
  *H04L 27/00* (2006.01)
  *H04L 5/00* (2006.01)

(52) U.S. Cl.
  CPC ......... *H04W 72/042* (2013.01); *H04L 5/0091* (2013.01); *H04L 27/0012* (2013.01)

(56) References Cited

U.S. PATENT DOCUMENTS

| | | | |
|---|---|---|---|
| 9,094,855 B2 | 7/2015 | Etemad et al. | |
| 2008/0175194 A1* | 7/2008 | Blanz | H04B 7/0632 |
| | | | 370/329 |
| 2014/0044061 A1* | 2/2014 | Yue | H04L 1/0077 |
| | | | 370/329 |
| 2014/0086160 A1* | 3/2014 | Kim | H04W 72/042 |
| | | | 370/329 |
| 2015/0071099 A1 | 3/2015 | Yi | |
| 2015/0078272 A1 | 3/2015 | Kim et al. | |
| 2015/0078307 A1* | 3/2015 | Ohta | H04W 76/27 |
| | | | 370/329 |
| 2015/0098440 A1* | 4/2015 | Yang | H04L 5/0051 |
| | | | 370/330 |
| 2015/0349933 A1* | 12/2015 | Davydov | H04W 52/16 |
| | | | 375/219 |
| 2016/0081099 A1* | 3/2016 | Nammi | H04J 11/004 |
| | | | 370/329 |

OTHER PUBLICATIONS

3rd Generation Partnership Project: Technical Specification Group Radio Access Network; Study on Network-Assisted Interference Cancellation and Suppression (NAIC) for LTE (Release 12), 3GPP Standard; 3GPP TR 36.866, 4rd Mobile Competence Centre; 650, Route des Lucioles; F-06921 Sophia-Antipolis Cedex; France, vol. RAN WG1, No. V12.0.1, Mar. 28, 2014, pp. 1-64, XP050770109.
Ericsson: "Higher-layer signaling for NAICS", 3GPP Draft; R1-142320, 3rd Generation Partnership Project (3GPP), Mobile Competence Centre; 650, Route des Lucioles; F-06921 Sophia-Antipolis Cedex; France, vol. RAN WG1, No. Seoul, Korea; May 19, 2014-May 23, 2014 May 18, 2014, XP050789437.
3GPP: Clarification of Reference PDSCH Power for CSI-RS based CSI Feedback, 3GPP TSG-RAN1 Meeting #66, R1-112833.
Jensen, Anders Riis, et al.; "LTE UE Power Consumption Model: For System Level Energy and Performance Optimization"; 2012 IEE Vehicular Technology Conference; Aalborg University, Denmark.
Niu, Li; "Inter-Cell Control Channel Interference Rejection for Downlink TD-LTE Systems" China Masters' Theses Full-Text Database.

* cited by examiner

PDSCH-Config IE 300

```
-- ASN1START

…

PDSCH-Config ::=
        p-dListServ                          SEQUENCE {SIZE (1..maxP-d) )   OF P-d,
        p-dListCoSch                         SEQUENCE (SIZE (1..maxP-d) )   OF P-d,
}

P-d ::= ENUMERATED {  dBx1, dBx2, dBx3, dBx4, dBx5, }

…

-- ASN1STOP
```

*FIG. 3*

Power Offset Table 400

| Serving PDSCH (useful) | | Co-Scheduled PDSCH (Interfering) | | Multiplexed PDSCH |
|---|---|---|---|---|
| Modulation | PdOffsetServ, dB | Modulation | PdOffsetCo-Sch, dB | Modulation |
| QPSK | $10\log_{10}(1/5)$ | QPSK | $10\log_{10}(4/5)$ | 16QAM |
| " " | $10\log_{10}(4/5)$ | " " | $10\log_{10}(1/5)$ | 16QAM |
| " " | $10\log_{10}(16/21)$ | 16QAM | $10\log_{10}(5/21)$ | 64QAM |
| " " | $10\log_{10}(64/85)$ | 64QAM | $10\log_{10}(21/85)$ | 256QAM |
| " " | 0 | - | $-\infty$ | QPSK |
| 16QAM | $10\log_{10}(5/21)$ | QPSK | $10\log_{10}(16/21)$ | 16QAM |
| " " | $10\log_{10}(1/17)$ | 16QAM | $10\log_{10}(16/17)$ | 256QAM |
| " " | $10\log_{10}(16/17)$ | " " | $10\log_{10}(1/17)$ | 256QAM |
| " " | 0 | - | $-\infty$ | 16QAM |
| 64QAM | $10\log_{10}(21/85)$ | QPSK | $10\log_{10}(64/85)$ | 256QAM |
| - | 0 | - | $-\infty$ | - |

SEND, AT AN eNB CAPABLE OF OPERATING IN COMPLIANCE WITH ONE OR MORE 3GPP LTE STANDARDS INCLUDING LTE-A, POWER OFFSET INFORMATION IN AN RRC IE TO AN UE, THE POWER OFFSET INFORMATION FOR A SERVING PDSCH AND/OR A CO-SCHEDULED PDSCH
702

SEND DCI INDICATING MODULATION INFORMATION FOR THE SERVING PDSCH
704

CAUSE DATA TO BE TRANSMITTED VIA THE SERVING PDSCH TO THE UE USING SAME TIME AND FREQUENCY RESOURCES AS USED FOR THE CO-SCHEDULED PDSCH, THE UE TO DETERMINE, FOR ONE OR MORE RBs, A FIRST DETECTED POWER OFFSET VALUE FOR THE SERVING PDSCH AND A SECOND DETECTED POWER OFFSET VALUE FOR THE CO-SCHEDULED PDSCH BASED ON THE POWER OFFSET OR THE MODULATION INFORMATION
706

*FIG. 7*

Storage Medium 800

Computer Executable Instructions for 700

```
RECEIVE, AT AN UE CAPABLE OF OPERATING IN COMPLIANCE WITH ONE
OR MORE 3GPP LTE STANDARDS INCLUDING LTE-A, POWER OFFSET
INFORMATION IN AN RRC IE FOR A SERVING PDSCH AND/OR A CO-
SCHEDULED PDSCH
1002
```

```
RECEIVE DCI INDICATING MODULATION INFORMATION FOR THE SERVING
PDSCH
1004
```

```
DETERMINE, FOR ONE OR MORE RBs, A FIRST DETECTED POWER OFFSET
VALUE FOR THE SERVING PDSCH AND A SECOND DETECTED POWER
OFFSET VALUE FOR THE CO-SCHEDULED PDSCH BASED ON THE POWER
OFFSET OR THE MODULATION INFORMATION
1006
```

```
DEMODULATE THE SERVING PDSCH BASED ON THE FIRST AND SECOND
DETECTED POWER OFFSET VALUES
1008
```

FIG. 10

Storage Medium 1100

*Computer Executable Instructions for 1000*

FIG. 11

TECHNIQUES FOR DETERMINING POWER OFFSETS OF A PHYSICAL DOWNLINK SHARED CHANNEL

CROSS-REFERENCE TO RELATED APPLICATIONS

This application is a national stage application claiming the benefit of and priority to International Application No. PCT/US2015/052202 entitled "TECHNIQUES FOR DETERMINING POWER OFFSETS OF A PHYSICAL DOWNLINK SHARED CHANNEL" filed Sep. 25, 2015, which claims the benefit of U.S. Provisional Patent Application No. 62/160,740 filed May 13, 2015; all of which are hereby incorporated by reference in their entirety.

TECHNICAL FIELD

Examples described herein are generally related to wireless communication devices.

BACKGROUND

Wireless communication networks such as those operating in according with one or more 3rd Generation Partnership Project (3GPP) Long Term Evolution (LTE) and LTE-Advanced (LTE-A) standards may rely on orthogonal multiplexing of resources related to most if not all physical channels. However, considering practical deployments of LTE-A wireless communication networks, distribution of user equipment (UEs) in a cell serviced by a base station of evolved Node B (eNB) may cause a large disparity of distances between the eNB and served UEs. For example a first UE may be located near a serving eNB, while a second UE may be located relatively farther from the serving eNB. In conventional LTE-A systems these two UEs may be served in orthogonal frequency-division multiple access (OFDMA) by allocating non-overlapping time and frequency resources (e.g., resource blocks (RBs)). However, the disparity of distances may be exploited to further improve spectral efficiency of downlink transmissions from the eNB. More specifically, the improvement may be achieved by using a non-orthogonal multiplexing scheme that may be otherwise known as multi-user superposition transmission.

BRIEF DESCRIPTION OF THE DRAWINGS

FIG. 3 illustrates an example PDSCH-Config Information element (IE).

FIG. 4 illustrates an example power offset table.

FIG. 7 illustrates an example of a second logic flow.

FIG. 8 illustrates an example of a first storage medium.

FIG. 10 illustrates an example of a third logic flow.

FIG. 11 illustrates an example of a second storage medium.

DETAILED DESCRIPTION

Figure 1:
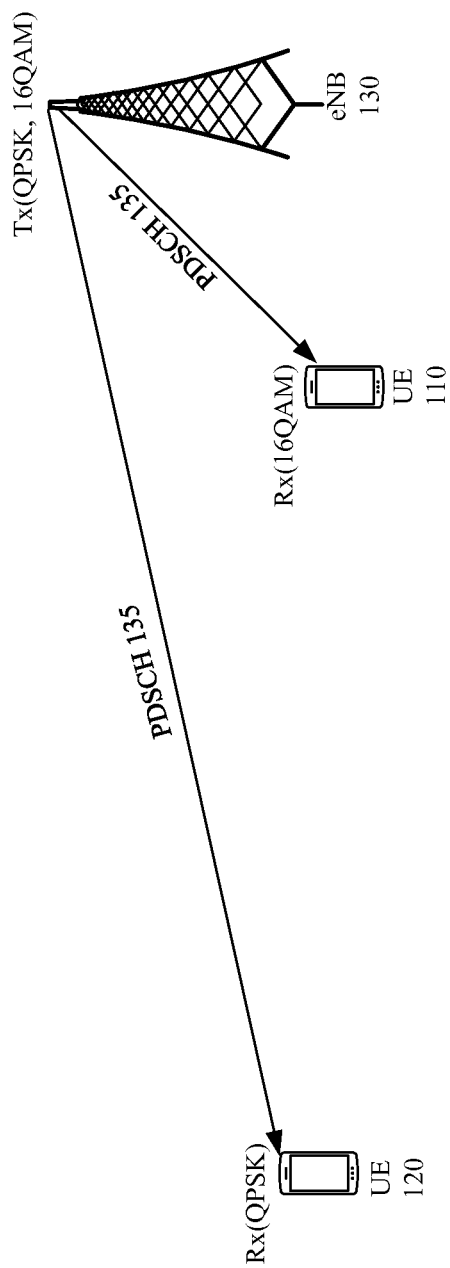
FIG. 1 illustrates an example of a system.

Examples are generally directed to improvements that may involve use of wireless mobile telecommunication cellular or wireless mobile broadband technologies. Wireless mobile broadband technologies may include any wireless technologies suitable for use with wireless devices or user equipment (UE), such as one or more third generation (3G), fourth generation (4G) or emerging fifth generation (5G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10, 11 or 12 of LTE/System Architecture Evolution (SAE), and so forth. The examples are not limited in this context.

By way of example and not limitation, various examples may be described with specific reference to various 3GPP radio access network (RAN) standards, such as the 3GPP Universal Terrestrial Radio Access Network (UTRAN), the 3GPP Evolved Universal Terrestrial Radio Access Network (E-UTRAN) and 3GPP's suite of UMTS and LTE/LTE-Advanced Technical Specifications (in case of LTE/LTE-Advanced collectively "3GPP LTE Specifications" according to the 36 Series of Technical Specifications), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 January 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 Standards"), and any drafts, revisions or variants of the 3GPP LTE Specifications and the IEEE 802.16 Standards. Although some embodiments may be described as a 3GPP LTE Specifications or IEEE 802.16 Standards system by way of example and not limitation, it may be appreciated that other types of communications system may be implemented as various other types of mobile broadband communications systems and standards. The examples are not limited in this context.

Inter-cell interference is considered as a dominant limiting factor for achieving higher network capacity in an LTE-A wireless network. In some conventional systems, inter-cell interference is mitigated by using coordinated multi-point techniques (CoMP) which help to avoid interference by algorithms implemented at a transmitting eNB (e.g., at the network side). However, some recent studies have shown that interference mitigation at the UE side may also provide promising spectral efficiency gains by considering spatial properties of the interference using linear minimum mean square error (MMSE) interference rejection combining (MMSE-IRC) or non-linear network-assisted interference cancellation and suppression (NAICS) receivers.

Enhancements for interference mitigation at the UE side may be achieved by considering more advanced NAICS receivers such as maximum likelihood (R-ML) or symbol level interference cancellation (SLIC) receivers which can utilize additional information about interference structure. For example, NAICS receivers could estimate interference parameters such as, but not limited to, a transmission mode, interference presence, power offset(s), modulation order or precoding to facilitate advanced interference cancellation and suppression. In order to facilitate operation of such receivers some higher layer signaling assistance may be provided. The higher layer signaling assistance may indicate parameters of an interfering signal that may enable at least some blind detection at the UE side for some signal parameters that may be used for reducing inter-cell interference. For example, the indicated parameters may include, but are not limited to, multicast-broadcast single-frequency network (MBSFN) subframe pattern, power offset subset, number of cell-specific reference signal (CRS) ports, set of the transmission modes or Cell ID.

According to some examples, principles associated with NAICS receivers dealing with inter-cell interference such as blind detection of power offset(s) may be extended to multi-user superposition transmission scenarios by providing higher layer (e.g., radio resource control (RRC)) signaling assistance relevant to intra-cell interference that may occur due to multiplexing of two or more signals to two or more UEs within a same cell over the same time frequency resources (e.g., multi-user superposition transmission). It is with respect to these and other challenges that the examples described herein are needed.

Figure 2:
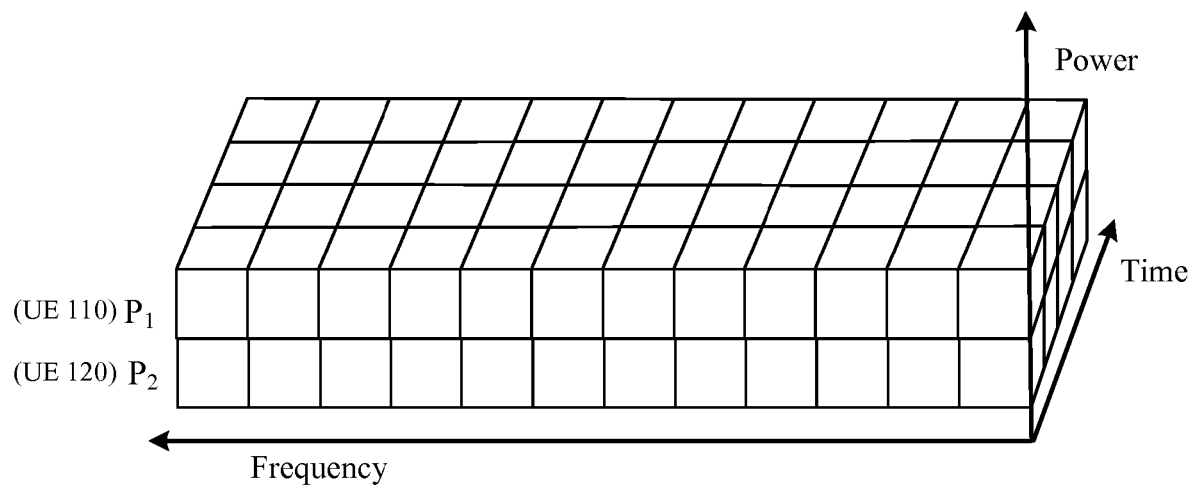
FIG. 2 illustrates an example physical downlink shared channel (PDSCH) scheme.

FIG. 1 illustrates an example system 100. In some examples, system 100 may be arranged to operate incompliance with one or more 3GPP LTE standards including LTE-A. For these examples, as shown in FIG. 1, system 100 may include UEs 110 and 120 and eNB 130. FIG. 1 also shows eNB 130 having a physical downlink shared channel (PDSCH) 135 with UEs 110 and 120. As shown in FIG. 2, UE 110 may be relatively closer to eNB 130 than UE 120.

In some examples, eNB 130 may be capable of implementing a non-orthogonal multiplexing scheme that may also be referred to as multi-user superposition transmission. For these examples, eNB may multiplex a serving signal to UE 120 via PDSCH 135 using a lower order modulation of quadrature phase shift keying (QPSK) and a serving signal to UE 110 via PDSCH 135 using a higher order modulation of 16 quadrature amplitude modulation (16QAM). For these examples, the lower order QPSK signal may be sent to the further away UE 120 due to possible signal propagation loss making higher order modulations such as 16QAM impractical or difficult for demodulation of information/data in a signal sent via PDSCH 135.

FIG. 2 illustrates an example PDSCH scheme 200. In some examples, PDSCH scheme 200 may be utilized by eNB 130 for multi-user superposition transmission of the QPSK and 16QAM to respective UEs 120 and 110 for transmitting PDSCH 130 to these UEs. For these examples, PDSCH scheme 200 as shown in FIG. 2 illustrates an example of the same time frequency resources be used to serve UEs 110 and 120. Also for these examples, a total transmit power of eNB 130 may be divided into $P_1$ and $P_2$ for signals designated to UEs 110 and 120, respectively. In other words, signals may be transmitted via PDSCH 135 over the same time frequency resources, as shown in FIG. 2 for PDSCH scheme 200.

According to some examples, a signal power relative to noise of PDSCH 135 at UE 110 may be higher than that of PDSCH 135 at UE 120. This difference may be due to UE 120 having a larger propagation loss due to its further distance from eNB 130. Also, a received signal via PDSCH 135 at UE 110 may include a serving/useful signal (hereinafter referred to as "serving PDSCH") as well as an interfering/co-scheduled signal (hereinafter referred to as "co-scheduled PDSCH") that has a serving/useful signal to UE 120. When demodulating the serving PDSCH at UE 110, the co-scheduled PDSCH may introduce intra-cell interference and the relative noise level for UE 110 may be much lower as compared to UE 120. For these examples, proper allocation of a modulation and coding scheme (MCS) and power distribution for $P_1$ and $P_2$ among signals transmitted via PDSCH 135 to respective UEs 110 and 120 may allow both UEs to receive information via these signals transmitted via PDSCH 135 over the same time frequency resources. More specifically, since a relative noise level of the UE 110 is lower than UE 120, UE 110 may be able to receive a co-scheduled PDSCH (treating the co-scheduled PDSCH as interference) and then subtract the recovered co-scheduled PDSCH from the received signal via PDSCH 135 for demodulation of the serving PDSCH in the presence of noise. As long as an allocated MCS for UE 110 does not exceed a capacity of a communication channel without any interference, UE 110 may receive information included in the received and demodulated useful signal included in the serving PDSCH.

FIG. 3 illustrates an example PDSCH-Config IE 300. In some examples, in order for an UE in a wireless network (e.g., UE 110) to suppress or cancel intra-cell interference (e.g., associated with multi-user superposition transmission) on a PDSCH the UE may need to determine a power offset and modulation order used by a serving PDSCH and a co-scheduled PDSCH. In some examples, higher layer signaling such as an RRC IE may be used by an eNB to convey at least some power offset information for at least the serving PDSCH. For some examples, an eNB may employ high layer signaling via use of a PDSCH-Config IE in the example format of PDSCH-Config IE 300, which may include one or more power offset values p-dListServ. For these examples, p-dListSery may correspond to possible power offset values that may be used by the eNB to transmit serving PDSCH. The PDSCH-Config IE in the example format of PDSCH-Config IE 300 may also include one or more p-dListCoSch corresponding to possible power offsets that may be used by the eNB to transmit scheduling PDSCH.

According to some examples, power offset subset signaled in the p-dListSery and p-dListCoSch of the PDSCH-Config IE in the example format of PDSCH-Config IE 300 may only use values from the quantized set P-d as shown in FIG. 3. Actual power offset values used by the eNB for the serving and potentially co-scheduled PDSCH on a given physical resource block may be determined by the UE from the indicated list using blind detection based on the received PDSCH signal.

In some examples, as shown in FIG. 3, the power offset parameter "P-d" may be defined as a ratio of serving/co-scheduled PDSCH EPRE (energy per resource element) to a cell-specific reference signal (CRS) EPRE or to a user-specific reference signal (UE-RS) EPRE. In another example, the power offset parameter "P-d" may be defined as a ratio of serving/co-scheduled PDSCH EPRE to the total PDSCH EPRE.

In some examples, the indicated power offset values or ratios included in parameters "p-dListServ" and "p-dListCosch" may be dependent on a modulation order used by a serving and co-scheduled PDSCH (e.g. QPSK, 16QAM, 64QAM, 256QAM). For these examples, an eNB may provide higher layer signaling of "p-dListServ" and "p-dListCoSch" for each modulation order (e.g. p-dListServQpsk, p-dListServ16Qam, etc.). The actual or detected power offset value for the serving PDSCH as well as the co-scheduled PDSCH may be determined by the UE for one or more given resource blocks (RBs) based on both the received PDSCH, modulation information indicated with DCI for the serving PDSCH as well as the power offset value or ratios included in parameters "p-a" and/or "p-d". According to some examples, the parameter of p-a may be determined based on TS 36.213 V12.5.0 that is entitled "3GPP; TS Group RAN; E-UTRA; Physical layer procedures (Release 12)", published March 2015, and is hereinafter referred to as TS 36.213. Although this disclosure is not limited to Rel. 12, subsequent releases to Rel. 12 of LTE/SAE and/or subsequent releases to TS 36.213 are also contemplated.

In some examples, only one of the serving PDSCH power offset value or the co-scheduled power offset value may be indicated in an IE in the example format of PDSCH-Config IE 300. For these examples, the UE receiving this IE may be capable of assuming that a total power of serving and co-scheduled PDSCH signals may be equal to "X', where X is equal to 1 or to the parameter indicated in "p-a" (e.g., as defined in TS 36.213 ) or some other value signaled to the UE via other types of IEs associated with high layer signaling.

According to some examples, after reception of power offsets values indicated in an RRC IE in the example format of PDSCH-Config IE 300 as well as using modulation information received via DCI, the UE may apply power offset detection algorithms to determine actual or detected power offsets used to transmit serving and co-scheduled PDSCH for each or one or more RBs used for or associated with multi-user superposition transmission. The UE may then include logic and/or features to demodulate the serving PDSCH based on the first and second detected power offset values. The demodulation may include suppressing the co-scheduled PDSCH based on a detected power offset value for the co-scheduled PDSCH to reduce interference caused by the co-scheduled PDSCH that was transmitted by the eNB using same time and frequency resources as used for the serving PDSCH that resulted from the multi-user superposition transmission.

FIG. 4 illustrates an example of a power offset table 400. Power offset table 400, as shown in FIG. 4, includes assigned power offset values for a serving PDSCH ("PdOffsetServ") and for a co-scheduled PDSCH ("PDOffsetCoSch."). The assigned power offset values may be in decibels (dB). In some examples, a eNB may be capable of selecting power offset values for both a serving PDSCH and a co-scheduled PDSCH based on power offset table 400 in such a way that a composite constellation of a multiplexed PDSCH may result in a constellation supported by a 3GPP LTE-A wireless network (e.g. QPSK, 16QAM, 64QAM or 256QAM). A determination of selected power offsets for serving and co-scheduled PDSCHs at the UE may be carried out by a detection of a modulation order of the composite constellation. For these examples, the modulation order of the composite constellation is shown in power offset table 400 in the "multiplexed PDSCH" column. For example, if the UE detects 64QAM in the composite constellation (multiplexed PDSCH) and is informed via DCI about QPSK modulation order for the serving PDSCH, then the assigned power offset for both the serving and co-scheduled PDSCH signals can be determined by matching the 64QAM and QPSK according to power offset table 400. According to power offset table 400 the matching of 64QAM with QPSK results in an assigned power offset for the serving PDSCH of 10 $\log_{10}(16/21)$ dB and an assigned power offset for co-scheduled PDSCH of 10 $\log_{10}(5/21)$ dB.

In some examples, a special case of a power offset of 0 dB for serving PDSCH or $-\infty$ for co-scheduling PDSCH in power offset table 400 is shown to support a transmission case from an eNB without multiplexing of PDSCH in the same time and frequency resources (e.g., no interference is expected from the co-scheduling PDSCH).

Figure 5:
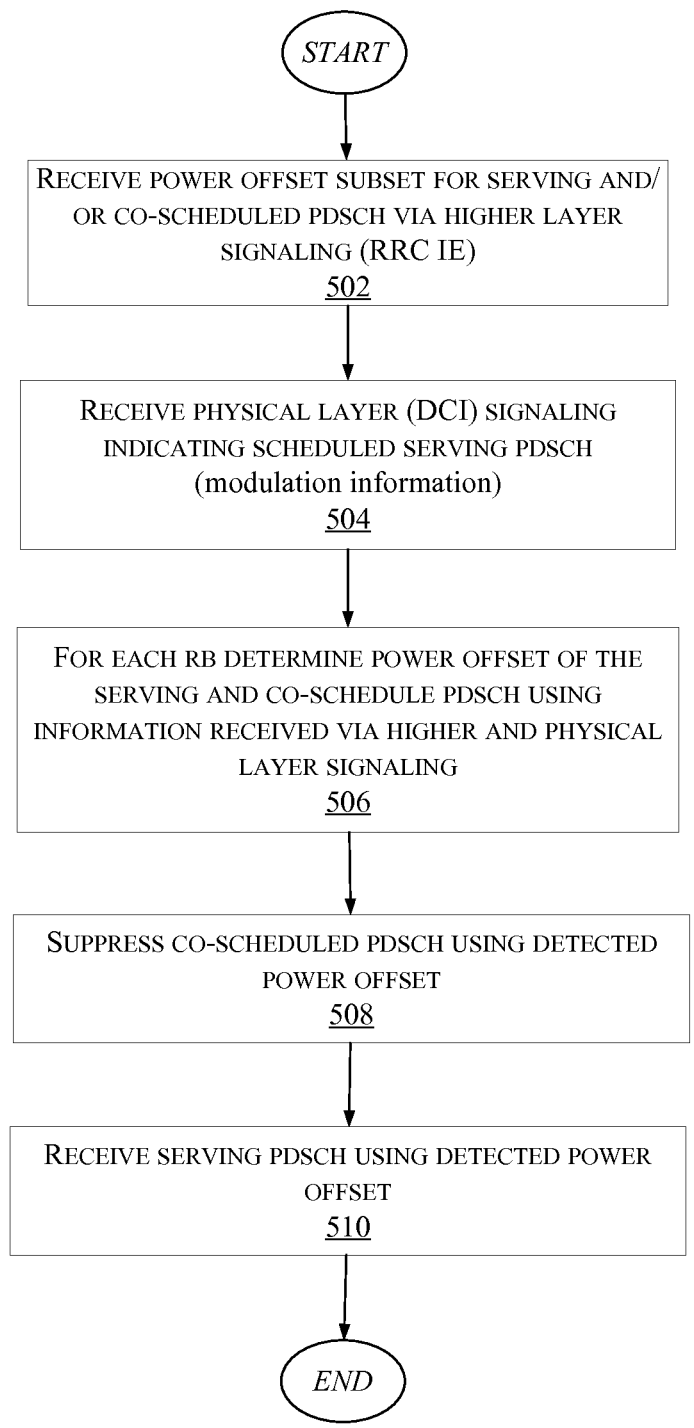
FIG. 5 illustrates an example of a first logic flow.

FIG. 5 illustrates an example of a logic flow 500. Logic flow 500 may be implemented or carried out by elements of system 100 as shown in FIG. 1 such as UE 110 or UE 120. Also, a PDSCH scheme such as PDSCH scheme 200 shown in FIG. 2 may be related to logic flow 500 as well as PDSCH-Config IE 300 and power offset table 400 shown in FIGS. 3 and 4. However, logic flow 500 is not limited to implementations using elements of system 100, PDSCH scheme 200, PDSCH-Config IE 300 or power offset table 400 as shown in FIG. 1-4 or discussed above.

Starting at block 502, a UE may receive power offset subset for serving and/or co-scheduled PDSCH via higher layer signaling. In some examples, the higher layer signaling may include an RRC IE in the format of the example format of PDSCH-Config IE 300 that was sent from an eNB to provide power offset information to the UE for the serving and/or co-scheduled PDSCH.

At block 504, the UE may also receive physical layer signaling indicating scheduled serving PDSCH. In some examples, the physical layer signaling may include DCI that indicates modulation information for the scheduled serving PDSCH. For these examples, the modulation information may indicate a modulation order for the scheduled serving PDSCH. The modulation order may include, but is not limited to, QPSK, 16QAM, 64QAM or 256QAM.

At block 506, the UE may include logic and/or features to determine for each RB power offset of the serving and co-scheduled PDSCH using information received via higher and physical layer signaling. In some examples, power offset information included in the received RRC IE as wells as the modulation information indicated in the DCI may be used to determine a first detected power offset value for the serving PDSCH and a second detected power offset value for the co-scheduled PDSCH for each RB assigned or available to the UE for receiving signals from the eNB via the serving PDSCH. Also, in some examples, blind detection of power using received PDSCH may also facilitate determination for each RB power offset.

At block 508, the UE may suppress co-scheduled PDSCH using detected power offset. In some examples, the UE may include logic and/or features to suppress the co-scheduled PDSCH based on the determined power offset value for the co-scheduled PDSCH for each or at least one or more RBs to reduce or eliminate interference caused by the co-scheduled PDSCH transmitted by the eNB via use of same time and frequency resources as used for the serving PDSCH.

At block 510, receive serving PDSCH using detected power offset. In some examples, the UE may include logic and/or features to demodulate the serving PDSCH based on the determined power offset value for the scheduled PDSCH for each or at least one or more RBs to receive information or data transmitted by the eNB via the serving PDSCH. Logic flow 500 then comes to an end.

Figure 6:
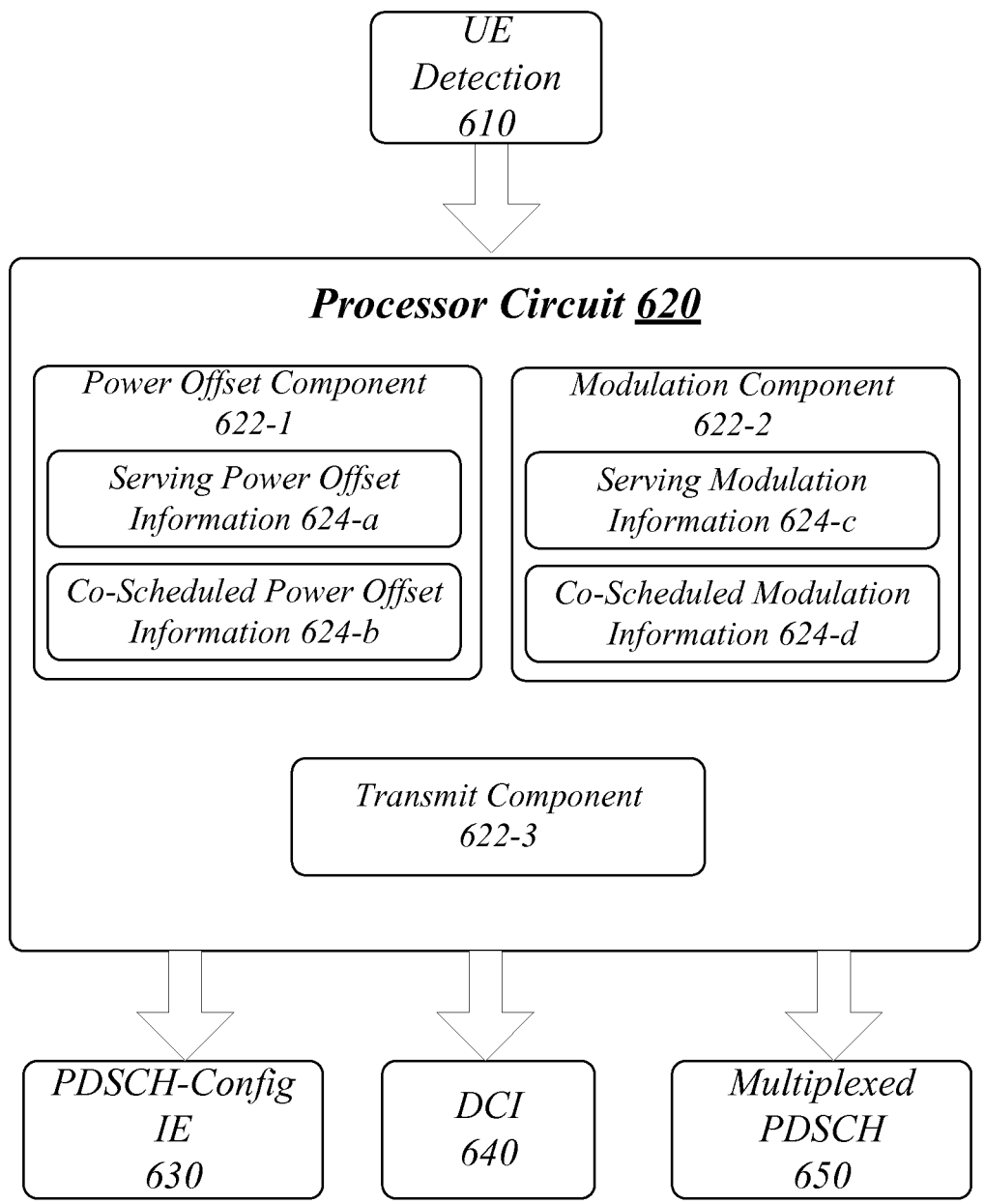
FIG. 6 illustrates an example block diagram for a first apparatus.

FIG. 6 illustrates a block diagram for an example first apparatus. As shown in FIG. 6, the example first apparatus includes apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may comprise a computer-implemented apparatus 600 having a processor circuit 620 arranged to execute one or more software components 622-*a*. It is worthy to note that "a" and "b" and "c" and similar designators as used herein are intended to be variables representing any positive integer. Thus, for example, if an implementation sets a value for a=3, then a complete set of software components 622-*a* may include components 622-1, 622-2 or 622-3. The examples are not limited in this context.

According to some examples, apparatus 600 may be implemented in an eNB (e.g., eNB 130) capable of operating in compliance with one or more 3GPP LTE Specifications including LTE-A. The examples are not limited in this context.

In some examples, as shown in FIG. 6, apparatus 600 includes processor circuit 620. Processor circuit 620 may be generally arranged to execute one or more software components 622-*a*. The processing circuit 620 can be any of various commercially available processors, including without limitation an AMD® Athlon®, Duron® and Opteron® processors; ARM® application, embedded and secure processors; Qualcomm® Snapdragon, IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom®, and XScale® processors; and similar processors. Dual microprocessors, multi-core processors, and other multi-processor architectures may also be employed as processing circuit 620. According to some examples, processor circuit 620 may also be an application specific integrated circuit (ASIC) and at least some components 622-*a* may be implemented as hardware elements of the ASIC.

According to some examples, apparatus 600 may include a power offset component 622-1. Power offset component 622-1 may be executed by processor circuit 620 to send power offset information in an RRC IE to an UE for a serving PDSCH) and/or a co-scheduled PDSCH. For these examples, power offset component 622-1 may send the power offset information responsive to UE detection 610. The power set information may be based on utilizing a multi-user superposition transmission that may cause intra-cell interference between the serving PDSCH and a co-scheduled PDSCH. Power offset component 622-1 may maintain serving power offset information 624-*a* and co-scheduled power offset information 624-*b* in a data structures such as a look up table (LUT). Serving power offset information 624-*a* may include serving PDSCH power offset values and co-scheduled power offset information 624-*b* may include co-scheduled PDSCH power offset values. These values may be included in PDSCH-Config IE 630 (e.g., in the example format of PDSCH-Config IE 300) that may sent to the UE.

In some examples, apparatus 600 may also include a modulation component 622-2. Modulation component 622-2 may be executed by processor circuit 620 to send DCI that indicates modulation information for the serving PDSCH and/or the co-scheduled PDSCH. For these examples, modulation component 622-2 may maintain serving modulation information 624-*c* and co-scheduled modulation information 624-*d* in a data structure such as a LUT. Serving modulation information 624-*c* may include modulation order information for the serving PDSCH. Co-scheduled modulation information 624-*d* may include modulation order information for the co-scheduled PDSCH. The DCI including the modulation information for the serving and/or co-scheduled PDSCH may be included in DCI 640.

According to some examples, apparatus 600 may also include a transmit component 622-3. Transmit component 622-3 may be executed by processor circuit 620 to cause data to be transmitted via the serving PDSCH to the UE using same time and frequency resources as used for the co-scheduled PDSCH. For these examples, the UE may determine, for one or more RBs, a first detected power offset value for the serving PDSCH and a second detected power offset value for the co-scheduled PDSCH based on the power offset or the modulation information. For these examples, the data may be included in multiplexed PDSCH 650 and the UE may be capable of demodulating the serving PDSCH from multiplexed PDSCH 650 while at the same time suppressing possible intra-cell interference caused by the co-scheduled PDSCH.

Various components of apparatus 600 and a device implementing apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by power offset component 622-1, modulation component 622-2, or transmit component 622-3 for apparatus 600 located at or with an eNB.

In the illustrated example shown in FIG. 7, logic flow 700 at block 702 may send, at an eNB capable of operating in compliance with one or more 3GPP LTE standards including LTE-A, power offset information in an RRC IE to an UE, the power offset information for a serving PDSCH and/or a co-scheduled PDSCH. In some examples, the RRC IE may be sent or caused to be sent by power offset component 622-1.

According to some examples, logic flow 700 at block 704 may send DCI indicating modulation information for the serving PDSCH. For these examples, the DCI may be sent or cause to be sent by modulation component 622-2.

In some examples, logic flow 700 at block 706 may cause data to be transmitted via the serving PDSCH to the UE using same time and frequency resources as used for the co-scheduled PDSCH. The UE may determine, for one or more resource blocks (RBs), a first detected power offset value for the serving PDSCH and a second detected power offset value for the co-scheduled PDSCH based on the power offset or the modulation information. For these examples, transmit component 622-3 may cause the data to be transmitted.

FIG. 8 illustrates an embodiment of a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
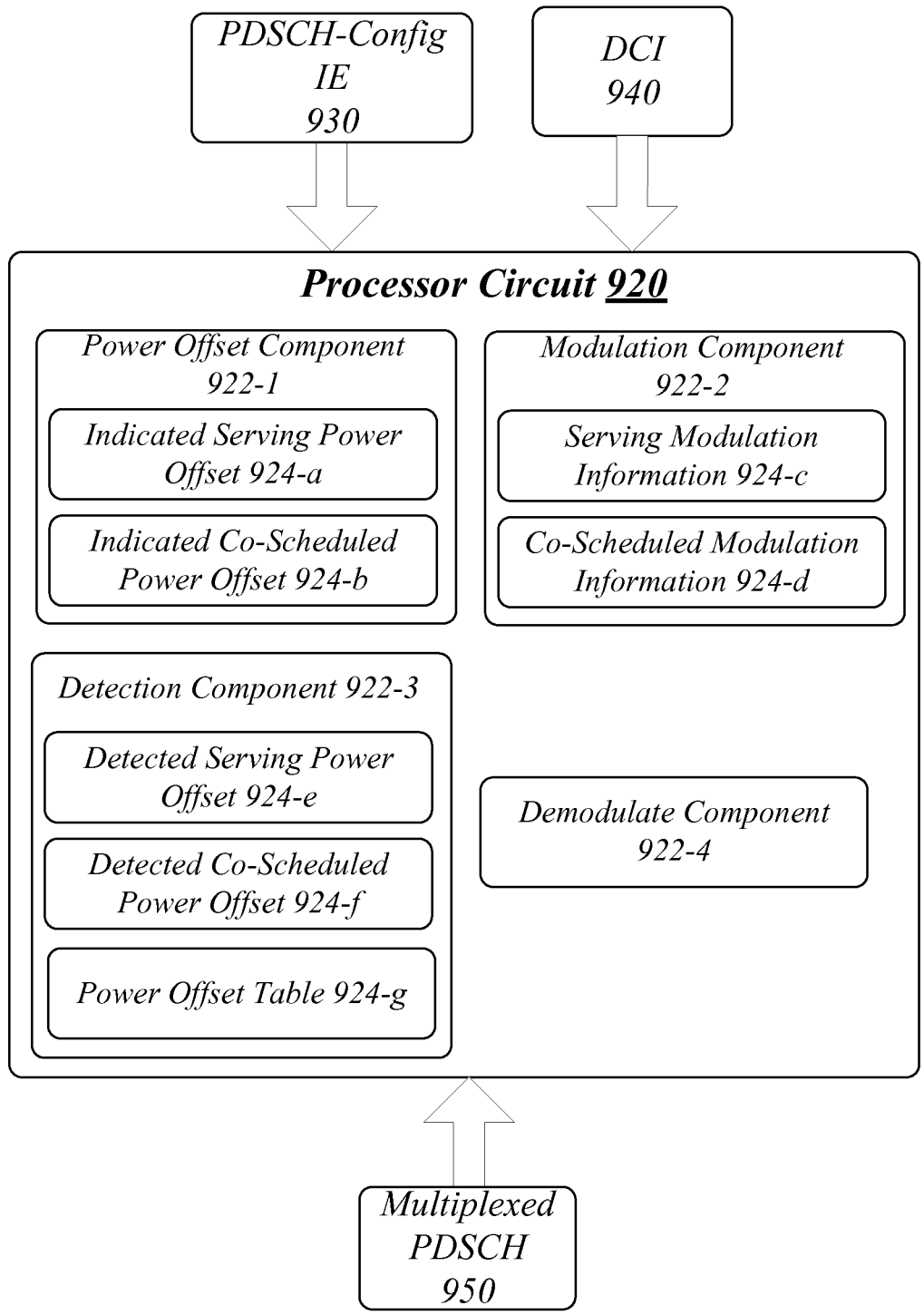
FIG. 9 illustrates an example block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may comprise a computer-implemented apparatus 900 having a processor circuit 920 arranged to execute one or more software components 922-$a$. It is worthy to note that "a" and "b" and "c" and similar designators as used herein are intended to be variables representing any positive integer. Thus, for example, if an implementation sets a value for a=4, then a complete set of software components 922-$a$ may include components 922-1, 922-2, 922-3 or 922-4. The examples are not limited in this context.

According to some examples, apparatus 900 may be implemented in an UE (e.g., UE 110 or 120) capable of operating in compliance with one or more 3GPP LTE Specifications including LTE-A. The examples are not limited in this context.

In some examples, as shown in FIG. 9, apparatus 900 includes processor circuit 920. Processor circuit 920 may be generally arranged to execute one or more software components 922-$a$. The processing circuit 920 can be any of various commercially available processors to include but not limited to the processors mentioned above for apparatus 600. Also, according to some examples, processor circuit 920 may also be an ASIC and at least some components 922-$a$ may be implemented as hardware elements of the ASIC.

According to some examples, apparatus 900 may include a power offset component 922-1. Power offset component 922-1 may be executed by processor circuit 920 to receive power offset information in an RRC IE for a serving PDSCH and/or a co-scheduled PDSCH. For these examples, the power offset information may be included in PDSCH-Config IE 930 (e.g., in the example format of PDSCH-Config IE 300). Power offset component 922-1 may maintain serving power offset information 924-$a$ and co-scheduled power offset information 924-$b$ in a data structures such as LUT. Serving power offset information 624-$a$ may include serving PDSCH power offset values and co-scheduled power offset information 624-$b$ may include co-scheduled PDSCH power offset values received via PDSCH-Config IE 930.

In some examples, apparatus 900 may also include modulation component 922-2. Modulation component 922-2 may be executed by processor circuit 920 to receive a DCI that indicates modulation information for the serving PDSCH. For these examples, the received DCI including the modulation information for the serving PDSCH may be DCI 940. Also for these examples, modulation component 922-2 may maintain serving modulation information 924-$c$ and co-scheduled modulation information 924-$d$ in a data structure such as a LUT. Serving modulation information 924-$c$ may include modulation order information for the serving PDSCH indicated in DCI 940. Co-scheduled modulation information 924-$d$ may include modulation order information for the co-scheduled PDSCH detected by the UE from the received PDSCH.

According to some examples, apparatus 900 may also include a detection component 922-3. Detection component 922-3 may be executed by processor circuit 920 to determine, for one or more RBs, a first detected power offset value for the serving PDSCH and a second detected power offset value for the co-scheduled PDSCH based on the power offset or the modulation information. For these examples, detection component 922-3 may maintain detected serving power offset 924-$e$, detected co-scheduled power offset 924-$f$ and power offset table 924-$g$ in one or more data structures including, but not limited to, one or more LUTs.

In some examples, apparatus 900 may also include demodulate component 922-4. Demodulate component 922-4 may be executed by processor circuit 920 to demodulate the serving PDSCH based on the first and second detected power offset values. For these examples, demodulation component 922-4 may have access to detected serving power offset 924-$e$, detected co-scheduled power offset 924-$f$ or power offset table 924-$g$. Demodulation component 924-4 may use at least some of this information to demodulate the serving PDSCH from multiplexed PDSCH 950 and to suppress the co-scheduled PDSCH to reduce or eliminate interference caused by the co-scheduled PDSCH transmitted by the eNB via use of same time and frequency resources as used for the serving PDSCH.

Various components of apparatus 900 and a device implementing apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by power offset component 922-1, modulation component 922-2, detection component 922-3 or demodulate component 922-4 for apparatus 900 located at or with an UE.

In the illustrated example shown in FIG. 10, logic flow 1000 at block 1002 may receive, at an UE capable of operating in compliance with one or more 3GPP LTE standards including LTE-A, power offset information in an RRC IE for a serving PDSCH and/or a co-scheduled PDSCH. For these examples, power offset component 922-1 may receive the RRC IE.

According to some examples, logic flow 1000 at block 1004 may receive DCI indicating modulation information for the serving PDSCH. For these examples, modulation component 922-2 may determine the DCI.

In some examples, logic flow 1000 at block 1006 may determine, for one or more RBs, a first detected power offset value for the serving PDSCH and a second detected power offset value for the co-scheduled PDSCH based on the power offset or the modulation information. For these examples, detection component 922-3 may determine the first and second power offset values.

According to some examples, logic flow 1000 at block 1008 may demodulate the serving PDSCH based on the first and second detected power offset values. For these example, demodulation component 922-4 may demodulated the serving PDSCH.

FIG. 11 illustrates an embodiment of a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
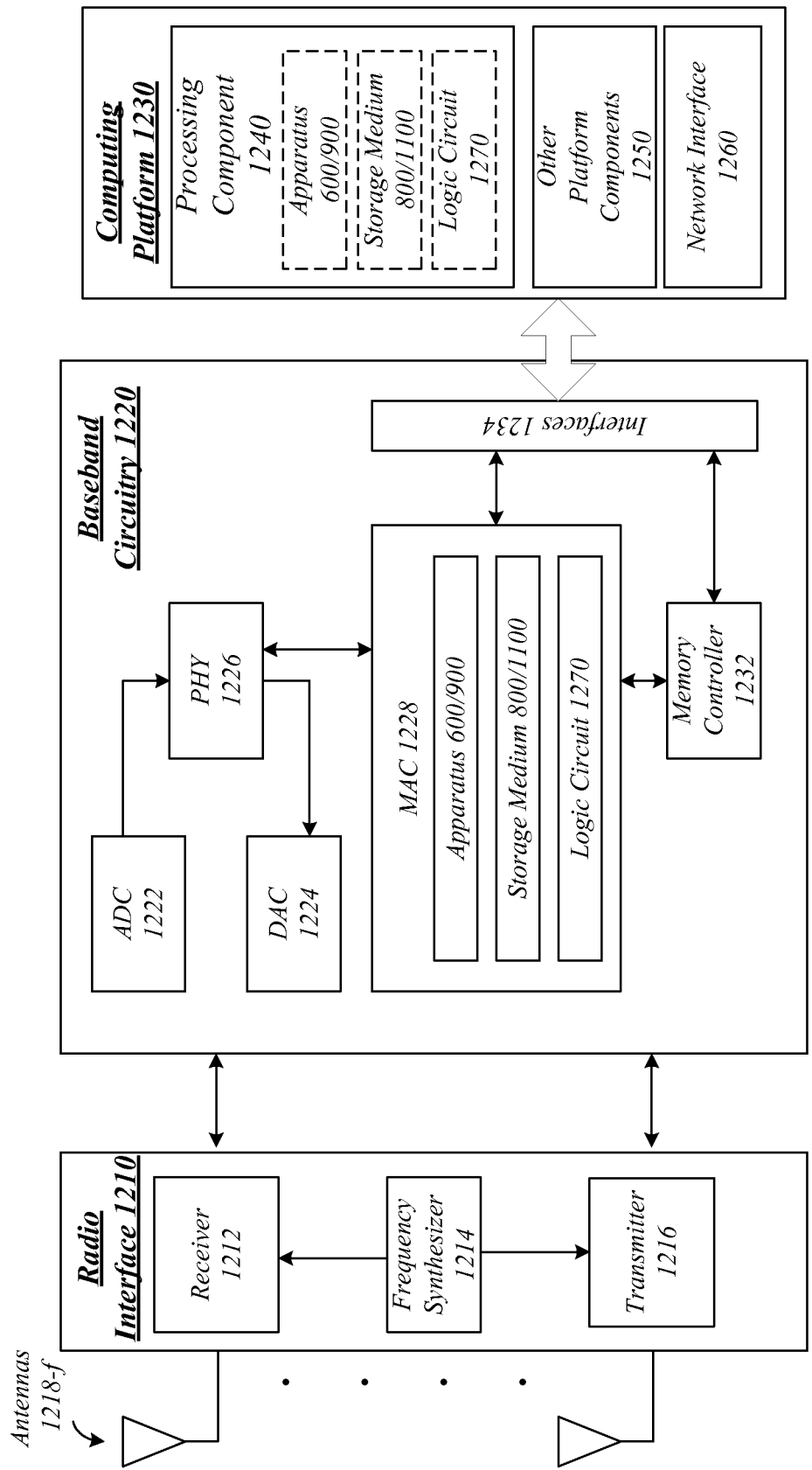
FIG. 12 illustrates an example of a device.

FIG. 12 illustrates an embodiment of a device 1200 for use in a broadband wireless access network. Device 1200 may implement, for example, apparatus 600/900, storage medium 800/1100 and/or a logic circuit 1270. The logic circuit 1270 may include physical circuits to perform operations described for apparatus 600/900. As shown in FIG. 12, device 1200 may include a radio interface 1210, baseband circuitry 1220, and computing platform 1230, although examples are not limited to this configuration.

The device 1200 may implement some or all of the structure and/or operations for the apparatus 600/900, storage medium 800/1100 and/or logic circuit 1270 in a single computing entity, such as entirely within a single device. Alternatively, the device 1200 may distribute portions of the structure and/or operations for apparatus 600/900, storage medium 800/1100 and/or logic circuit 1270 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The examples are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218-f. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1226 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with MAC processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames (e.g., containing subframes). Alternatively or in addition, MAC processing circuit 1228 may share processing for certain of these functions or perform these processes independent of PHY processing circuit 1226. In some embodiments, MAC and PHY processing may be integrated into a single circuit.

Computing platform 1230 may provide computing functionality for device 1200. As shown, computing platform 1230 may include a processing component 1240. In addition to, or alternatively of, baseband circuitry 1220 of device 1200 may execute processing operations or logic for apparatus 600/900, storage medium 800/1100, and logic circuit 1270 using the processing component 1230. Processing component 1240 (and/or PHY 1226 and/or MAC 1228) may comprise various hardware elements, software elements, or a combination of both. Examples of hardware elements may include devices, logic devices, components, processors, microprocessors, circuits, processor circuits (e.g., processor circuit 620 or 920), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1230 may further include a network interface 1260. In some examples, network interface 1260 may include logic and/or features to support wireless network interfaces as described in one or more 3GPP LTE or LTE-A specifications or standards. For these examples, network interface 1260 may enable an apparatus 600 or 900 located at respective eNB and UE to communicate with each other or with other networked devices.

Device 1200 may be, for example, a computer, a personal computer (PC), a desktop computer, a laptop computer, an ultrabook computer, a smartphone, a tablet computer, a notebook computer, a netbook computer, a work station, a mini-computer, multiprocessor system, processor-based system, wireless access point, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 1200 may be implemented using single input single output (SISO) architectures. However, certain implementations may include multiple antennas (e.g., antennas 1218-$f$) for transmission and/or reception using adaptive antenna techniques for beamforming or spatial division multiple access (SDMA) and/or using multiple input multiple output (MIMO) communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Figure 13:
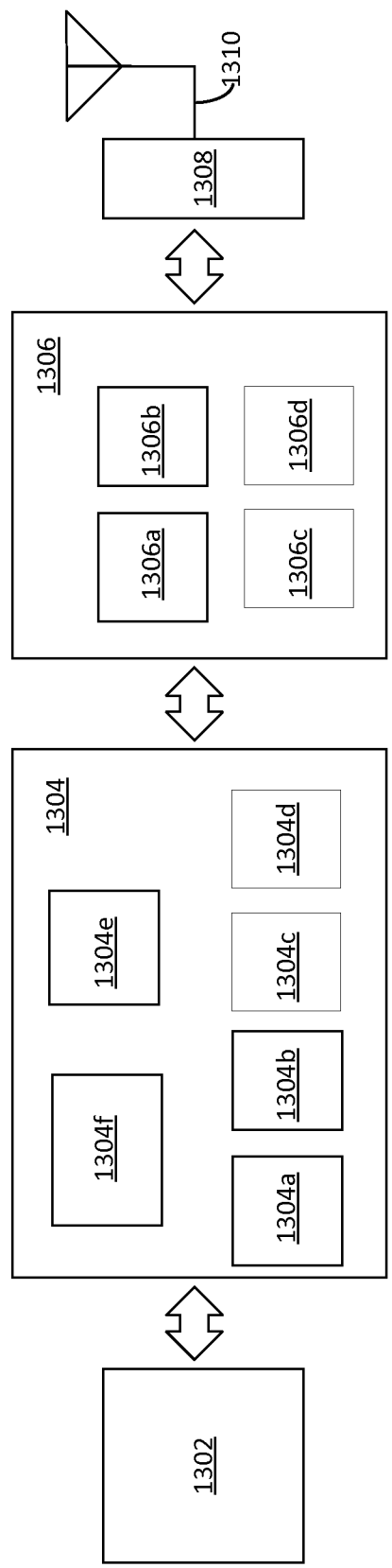
FIG. 13 illustrates an example user equipment (UE) device.

FIG. 13 illustrates an example UE device 1300. Examples described herein may be implemented into a system using any suitably configured hardware and/or software. FIG. 13 illustrates example components of UE device 1300. In some embodiments, the UE device 1300 may include application circuitry 1302, baseband circuitry 1304, Radio Frequency (RF) circuitry 1306, front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuity 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a -d) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the UE device 1300 may include additional elements such as, for example, memory/storage, display, camera, sensor, and/or input/output (I/O) interface.

Figure 14:
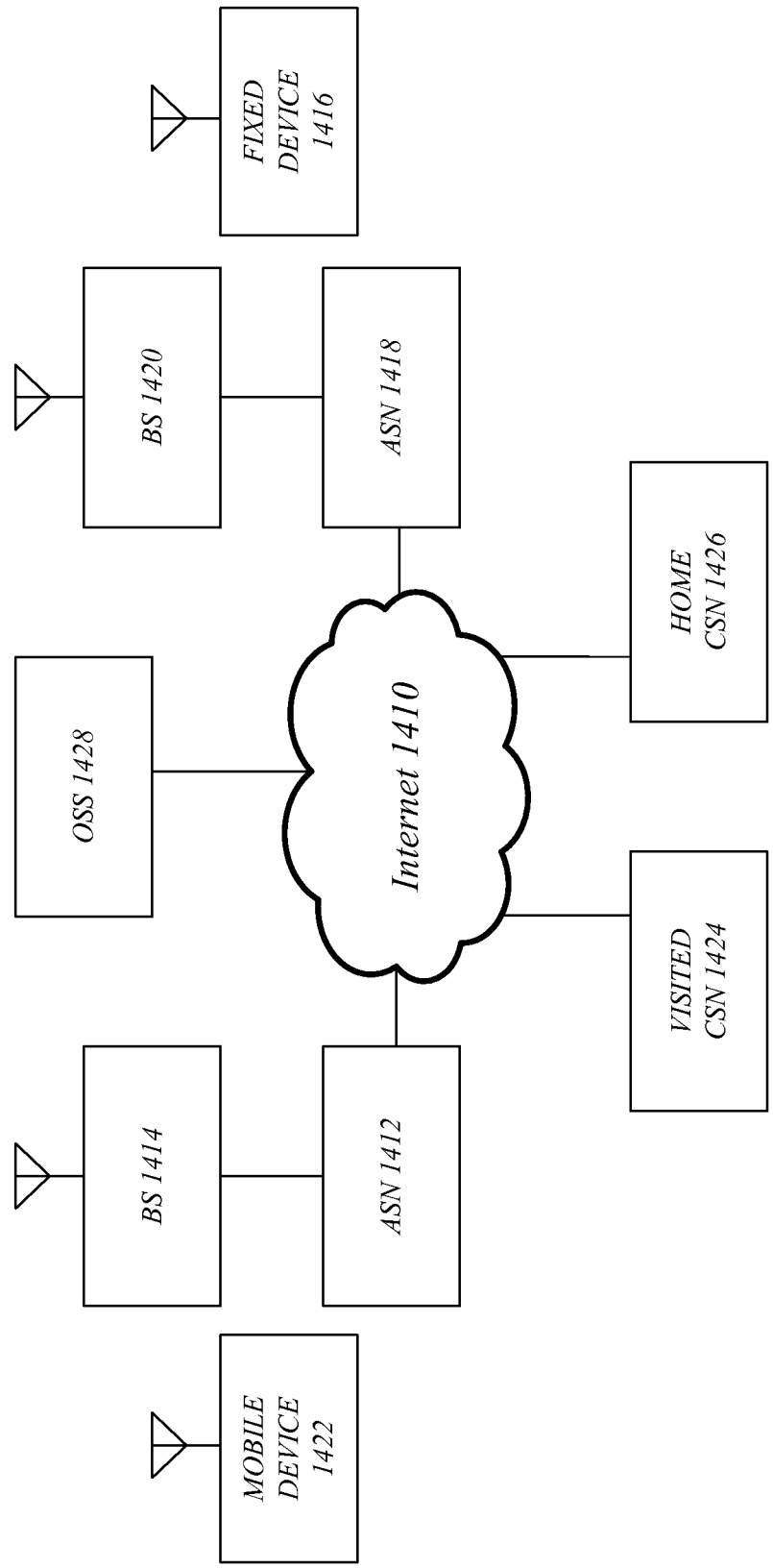
FIG. 14 illustrates an example of a broadband wireless access system.

FIG. 14 illustrates an embodiment of a broadband wireless access system 1400. As shown in FIG. 14, broadband wireless access system 1400 may be an internet protocol (IP) type network comprising an internet 1410 type network or the like that is capable of supporting mobile wireless access and/or fixed wireless access to internet 1410. In one or more embodiments, broadband wireless access system 1400 may comprise any type of orthogonal frequency division multiple access (OFDMA) and/or multiple single carrier frequency division multiple access (multiple SC-FDMA) based wireless network, such as a system compliant with one or more of the 3GPP LTE Specifications and/or IEEE 802.16 Standards, and the scope of this disclosure is not limited in these respects.

In the exemplary broadband wireless access system 1400, access service networks (ASN) 1412, 1418 are capable of coupling with base stations (BS) 1414, 1420 (RRHs or eNBs), respectively, to provide wireless communication between one or more fixed devices 1416 and internet 1410, or one or more mobile devices 1422 and Internet 1410. One example of a fixed device 1416 and a mobile device 1422 may be a UE such as UE 110 shown in FIG. 1, with the fixed device 1416 comprising a stationary version of UE 110 and the mobile device 1422 comprising a mobile version of UE 110. ASN 1412 may implement profiles that are capable of defining the mapping of network functions to one or more physical entities on broadband wireless access system 1400. Base stations 1414, 1420 (or eNBs) may comprise radio equipment to provide RF communication with fixed device 1416 and mobile device 1422, such as described with reference to device 1400, and may comprise, for example, the PHY, MAC, RLC or PDCP layer equipment in compliance with a 3GPP LTE Specification or an IEEE 802.16 Standard. Base stations 1414, 1420 (or eNBs) may further comprise an IP backplane to couple to Internet 1410 via ASN 1412, 1418, respectively, although the scope of the claimed subject matter is not limited in these respects.

Broadband wireless access system 1400 may further comprise a visited connectivity service network (CSN) 1424 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CSN 1424 or home CSN 1426, and the scope of the claimed subject matter is not limited in these respects. Visited CSN 1424 may be referred to as a visited CSN in the case where visited CSN 1424 is not part of the regular service provider of fixed device 1416 or mobile device 1422, for example where fixed 1416 or mobile device 1422 is roaming away from their respective home CSN 1426, or where broadband wireless access system 1400 is part of the regular service provider of fixed device 1416 or mobile device 1422 but where broadband wireless access system 1400 may be in another location or state that is not the main or home location of fixed device 1416 or mobile device 1422.

Fixed device 1416 may be located anywhere within range of one or both base stations 1414, 1420, such as in or near a home or business to provide home or business customer broadband access to Internet 1410 via base stations 1414, 1420 and ASN 1412, 1418, respectively, and home CSN 1426. It is worthy to note that although fixed device 1416 is generally disposed in a stationary location, it may be moved to different locations as needed. Mobile device 1422 may be utilized at one or more locations if mobile device 1422 is within range of one or both base stations 1414, 1420, for example.

In accordance with one or more embodiments, operation support system (OSS) 1428 may be part of broadband wireless access system 1400 to provide management functions for broadband wireless access system 1400 and to provide interfaces between functional entities of broadband wireless access system 1400. Broadband wireless access system 1400 of FIG. 14 is merely one type of wireless network showing a certain number of the components of broadband wireless access system 1400, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include logic, at least a portion of the logic in hardware, the logic located with an UE capable of operating in compliance with one or more 3GPP LTE standards including LTE-A. For these examples the logic may receive power offset information in an RRC IE for a serving PDSCH and/or a co-scheduled PDSCH. The logic may also, receive downlink control information indicating modulation information for the serving PDSCH. The logic may also determine, for one or more RBs, a first detected power offset value for the serving PDSCH and a second detected power offset value for the co-scheduled PDSCH based on the power offset or the modulation information.

EXAMPLE 2

The apparatus of example 1, the logic may also demodulate the serving PDSCH based on the first detected power offset value.

EXAMPLE 3

The apparatus of example 2, the logic to demodulate the serving PDSCH may include the logic to suppress the co-scheduled PDSCH based on the second detected power offset value to reduce interference caused by the co-scheduled PDSCH transmitted by an eNB via use of same time and frequency resources as used for the serving PDSCH.

EXAMPLE 4

The apparatus of example 1, the logic may determine the first and second detected power offset values based on the power offset information. For these examples, the determination may further include the power offset information to indicate a first indicated power offset subset for the serving PDSCH that includes a first ratio of the serving PDSCH and the co-scheduled PDSCH EPRE to a CRS, a second ratio of the serving PDSCH and the co-scheduled PDSCH EPRE to an UE-RS EPRE or a third ratio of the serving PDSCH and co-scheduled PDSCH EPRE to a total PDSCH EPRE. The logic may then determine the first and second detected power offset values based on the first ratio, the second ratio or the third ratio.

EXAMPLE 5

The apparatus of example 4, the logic may determine the first and second detected power offset values based on both the power offset information and the modulation information for the serving PDSCH. The modulation information may indicate a first modulation order for the serving PDSCH, the first ratio, the second ratio or the third ratio based on the first modulation order.

EXAMPLE 6

The apparatus of example 1, the logic may determine the first and second detected power offset values based on the power offset information. For these examples, the determination may further include the power offset information to indicate one of at least two power offset values including a first value of 0 dB and a second value represented by "Pa", where Pa is according to a first 3GPP TS to include TS 36.213.

EXAMPLE 7

The apparatus of example 6, the first value of 0 dB may indicate no expected interference from the co-scheduled PDSCH. The second value represented by Pa may indicate expected interference from the co-scheduled PDSCH.

EXAMPLE 8

The apparatus of example 1, the logic may determine the first and second detected power offset values based on the modulation information. The modulation information may indicate a first modulation order for the serving PDSCH. For these examples, the logic may detect a composite constellation of a multiplexed PDSCH that includes the serving PDSCH and the co-scheduled PDSCH. The logic may also determine a second modulation order for the co-scheduled PDSCH based on the composite constellation and the first modulation order. The logic may also match a first assigned power offset value to the serving PDSCH and match a second assigned power offset value to the co-scheduled PDSCH based on both the indicated first modulation order and the determined second modulation order.

EXAMPLE 9

The apparatus of example 1 may also include a digital display coupled to the processor circuit to present a user interface view.

EXAMPLE 10

An example method may include receiving, at UE capable of operating in compliance with one or more 3GPP LTE standards including LTE-A, power offset information in an RRC IE for a serving PDSCH and/or a co-scheduled PDSCH. The method may also include receiving downlink control information indicating modulation information for the serving PDSCH. The method may also include determining, for one or more RBs, a first detected power offset value for the serving PDSCH and a second detected power offset value for the co-scheduled PDSCH based on the power offset or the modulation information.

EXAMPLE 11

The method of example 10 may also include demodulating the serving PDSCH based on the first detected power offset value.

EXAMPLE 12

The method of example 11, demodulating the serving PDSCH may include suppressing the co-scheduled PDSCH based on the second detected power offset value to reduce interference caused by the co-scheduled PDSCH that was transmitted by an eNB using same time and frequency resources as used for the serving PDSCH.

EXAMPLE 13

The method of example 10, determining the first and second detected power offset values may be based on the power offset information. The determining may further include the power offset information indicating a first indicated power offset subset for the serving PDSCH that indicates a first ratio of the serving PDSCH and the co-scheduled PDSCH EPRE to a CRS, a second ratio of the serving PDSCH and the co-scheduled PDSCH EPRE to an UE-RS EPRE or a third ratio of the serving PDSCH and co-scheduled PDSCH EPRE to a total PDSCH EPRE. For these examples, determining the first and second detected power offset values may be based on the first ratio, the second ratio or the third ratio.

EXAMPLE 14

The method of example 13, determining the first and second detected power offset values may be based on both the power offset information and the modulation information for the serving PDSCH. The modulation information may indicate a first modulation order for the serving PDSCH, the first ratio, the second ratio or the third ratio based on the first modulation order.

EXAMPLE 15

The method of example 10, determining the first and second detected power offset values may be based on the power offset information. The determining may further include the power offset information indicating one of at least two power offset values including a first value of 0 dB and a second value represented by "Pa", where Pa is according to a first 3GPP TS to include TS 36.213.

EXAMPLE 16

The method of example 15, the first value of 0 dB may indicate no expected interference from the co-scheduled PDSCH. The second value represented by Pa may indicate expected interference from the co-scheduled PDSCH.

EXAMPLE 17

The method of example 10, determining the first and second detected power offset values may be based on the modulation information. The determining may further include the modulation information indicating a first modulation order for the serving PDSCH. The determining may also include detecting a composite constellation of a multiplexed PDSCH that includes the serving PDSCH and the co-scheduled PDSCH. The determining may also include determining a second modulation order for the co-scheduled PDSCH based on the composite constellation and the first modulation order and matching a first assigned power offset value to the serving PDSCH and matching a second assigned power offset value to the co-scheduled PDSCH based on both the indicated first modulation order and the determined second modulation order.

EXAMPLE 18

An example at least one machine readable medium may include a plurality of instructions that in response to being executed on a system at UE may cause the system to carry out a method according to any one of examples 10 to 17.

EXAMPLE 19

An example apparatus may include means for performing the methods of any one of examples 11 to 17.

EXAMPLE 20

At least one machine readable medium may include a plurality of instructions that in response to being executed on a system for UE capable of operating in compliance with one or more or more 3GPP LTE standards including LTE-A may cause the system to receive power offset information in an RRC IE for a serving PDSCH and/or a co-scheduled PDSCH. The instructions may also cause the system to receive downlink control information indicating modulation information for the serving PDSCH. The instructions may also cause the system to determine, for one or more RBs, a first detected power offset value for the serving PDSCH and a second detected power offset value for the co-scheduled PDSCH based on the power offset or the modulation information.

EXAMPLE 21

The at least one machine readable medium of example 20, the instruction to may cause the system to demodulate the serving PDSCH based on the first and second detected power offset values.

EXAMPLE 22

The at least one machine readable medium of example 21, the system to demodulate the serving PDSCH includes the instructions to cause the system to suppress the co-scheduled PDSCH based on the second detected power offset value to reduce interference caused by the co-scheduled PDSCH transmitted by an eNB via use of same time and frequency resources as used for the serving PDSCH.

EXAMPLE 23

The at least one machine readable medium of example 20, the instructions may cause the system to determine the first and second detected power offset values based on the power offset information. For these examples, the determination may further include the power offset information to indicate a first indicated power offset subset for the serving PDSCH that includes a first ratio of the serving PDSCH and the co-scheduled PDSCH EPRE to a CRS. The determination may also include a second ratio of the serving PDSCH and the co-scheduled PDSCH EPRE to an UE-RS EPRE or a third ratio of the serving PDSCH and co-scheduled PDSCH EPRE to a total PDSCH EPRE. The instructions may then cause the system to determine the first and second detected power offset values based on the first ratio, the second ratio or the third ratio.

EXAMPLE 24

The at least one machine readable medium of example 23, the instructions may cause the system to determine the first and second detected power offset values based on both the power offset information and the modulation information for the serving PDSCH. The modulation information may indicate a first modulation order for the serving PDSCH, the first ratio, the second ratio or the third ratio based on the first modulation order.

EXAMPLE 25

The apparatus of example 20, the instructions may cause the system to determine the first and second detected power offset values based on the power offset information. The determination may further include the power offset information to indicate one of at least two power offset values including a first value of 0 dB and a second value represented by "Pa", where Pa is according to a first 3GPP TS to include TS 36.213.

EXAMPLE 26

The at least one machine readable medium of example 25, the first value of 0 dB may indicate no expected interference from the co-scheduled PDSCH. The second value represented by Pa may indicate expected interference from the co-scheduled PDSCH.

EXAMPLE 27

The at least one machine readable medium of example 20, the instructions may cause the system to determine the first and second detected power offset values based on the modulation information. The modulation information may indicate a first modulation order for the serving PDSCH. The instructions may further cause the system to detect a composite constellation of a multiplexed PDSCH that includes the serving PDSCH and the co-scheduled PDSCH. The instructions may also cause the system to determine a second modulation order for the co-scheduled PDSCH based on the composite constellation and the first modulation order. The instructions may also cause the system to match a first assigned power offset value to the serving PDSCH and match a second assigned power offset value to the co-scheduled PDSCH based on both the indicated first modulation order and the determined second modulation order.

EXAMPLE 28

An example apparatus may include logic, at least a portion of the logic in hardware, the logic located with an eNB capable of operating in compliance with capable of operating in compliance with one or more 3GPP LTE standards including LTE-A. For these examples, the logic may send power offset information in an RRC IE to a UE. The power offset information may be for a serving PDSCH and/or a co-scheduled PDSCH. The logic may also send downlink control information that indicates modulation information for the serving PDSCH. The logic may also cause data to be transmitted via the serving PDSCH to the UE using same time and frequency resources as used for the co-scheduled PDSCH. The UE may determine, for one or more RBs, a first detected power offset value for the serving PDSCH and a second detected power offset value for the co-scheduled PDSCH based on the power offset or the modulation information.

EXAMPLE 29

The apparatus of example 28, the power offset information may indicate a first indicated power offset subset for the serving PDSCH that includes first ratio of the serving PDSCH and the co-scheduled PDSCH EPRE to an CRS, a second ratio of the serving PDSCH and the co-scheduled PDSCH EPRE to an UE-RS EPRE or a third ratio of the serving PDSCH and co-scheduled PDSCH EPRE to a total PDSCH EPRE, the UE to determine the first and second detected power offset values based on the first ratio, the second ratio or the third ratio.

EXAMPLE 30

The apparatus of example 29, the modulation information may indicate a first modulation order for the serving PDSCH. The UE may determine the first and second detected power offset values based on both the power offset information and the modulation information for the serving PDSCH. the first ratio, the second ratio or the third ratio based on the first modulation order.

EXAMPLE 31

The apparatus of example 28, the UE may determine the first and second detected power offset values based on the power offset information. The power offset information may indicate one of at least two power offset values including a first value of 0 dB and a second value represented by "Pa", where Pa is according to a first 3GPP TS to include TS 36.213.

EXAMPLE 32

The apparatus of example 31, the first value of 0 dB may indicate no expected interference from the co-scheduled PDSCH. The second value represented by Pa may indicate expected interference from the co-scheduled PDSCH.

EXAMPLE 33

The apparatus of example 28 may also include a digital display coupled to the processor circuit to present a user interface view.

EXAMPLE 34

An example method may include sending, at an eNB capable of operating in compliance with capable of operating in compliance with one or more 3GPP LTE standards including LTE-A, power offset information in an RRC IE to a UE. The power offset information may be for a serving PDSCH and/or a co-scheduled PDSCH. The method may also include sending downlink control information indicating modulation information for the serving PDSCH. The method may also include causing data to be transmitted via the serving PDSCH to the UE using same time and frequency resources as used for the co-scheduled PDSCH. The UE may determine, for one or more RBs, a first detected power offset value for the serving PDSCH and a second detected power offset value for the co-scheduled PDSCH based on the power offset or the modulation information.

EXAMPLE 35

The method of example 34, the power offset information may indicate a first indicated power offset subset for the serving PDSCH that indicates first ratio of the serving PDSCH and the co-scheduled PDSCH EPRE to a CRS, a second ratio of the serving PDSCH and the co-scheduled PDSCH EPRE to an UE-RS EPRE or a third ratio of the serving PDSCH and co-scheduled PDSCH EPRE to a total PDSCH EPRE. For these examples, the UE may determine the first and second detected power offset values based on the first ratio, the second ratio or the third ratio.

EXAMPLE 36

The method of example 35, the modulation information may indicate a first modulation order for the serving PDSCH. The UE may determine the first and second detected power offset values based on both the power offset information and the modulation information for the serving PDSCH, the first ratio or the second ratio based on the first modulation order.

Example 37

The method of example 35, the UE may determine the first and second detected power offset values based on the power offset information. The power offset information may indicate one of at least two power offset values including a first value of 0 dB and a second value represented by "Pa", where Pa is according to a first 3GPP TS to include TS 36.213.

EXAMPLE 38

The method of example 37, the first value of 0 dB may indicate no expected interference from the co-scheduled PDSCH. The second value represented by Pa may indicate expected interference from the co-scheduled PDSCH.

EXAMPLE 39

An example at least one machine readable medium may include a plurality of instructions that in response to being executed on a system at an eNB may cause the system to carry out a method according to any one of examples 34 to 38.

EXAMPLE 40

An example apparatus may include means for performing the methods of any one of examples 34 to 38.

EXAMPLE 41

An example at least one machine readable medium may include a plurality of instructions that in response to being executed on a system for an eNB capable of operating in compliance with one or more or more 3GPP LTE standards including LTE-A causes the system to send power offset information in a RRC IE to an UE. The power offset information may be for a serving physical downlink shared channel (PDSCH) and/or a co-scheduled PDSCH. The instructions may also cause the system to send downlink control information that indicates modulation information for the serving PDSCH. The instructions may also cause the system to cause data to be transmitted via the serving PDSCH to the UE using same time and frequency resources as used for the co-scheduled PDSCH. The UE may determine, for one or more RBs, a first detected power offset value for the serving PDSCH and a second detected power offset value for the co-scheduled PDSCH based on the power offset or the modulation information.

EXAMPLE 42

The least one machine readable medium of claim 41, the power offset information may indicate a first indicated power offset subset for the serving PDSCH that includes first ratio of the serving PDSCH and the co-scheduled PDSCH energy per resource element (EPRE) to a cell-specific reference signal (CRS), a second ratio of the serving PDSCH and the co-scheduled PDSCH EPRE to a user-specific reference signal (UE-RS) EPRE or a third ratio of the serving PDSCH and co-scheduled PDSCH EPRE to a total PDSCH EPRE. For these examples, the UE may determine the first and second detected power offset values based on the first ratio, the second ratio or the third ratio.

EXAMPLE 43

The least one machine readable medium of claim 42, the modulation information may indicate a first modulation order for the serving PDSCH. The UE may determine the first and second detected power offset values based on both the power offset information and the modulation information for the serving PDSCH. The first ratio, the second ratio or the third ratio may be based on the first modulation order.

EXAMPLE 44

The least one machine readable medium of claim 41, the UE may determine the first and second detected power offset values based on the power offset information. The power offset information may indicate one of at least two power offset values including a first value of 0 decibel (dB) and a second value represented by "Pa", where Pa is according to a first 3GPP technical specification (TS) to include TS 36.213.

EXAMPLE 45

The least one machine readable medium of claim 44, the first value of 0 dB may indicate no expected interference from the co-scheduled PDSCH. The second value represented by Pa may indicate expected interference from the co-scheduled PDSCH.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the examples. In addition, in the foregoing Detailed Description, it can be seen that various features are grouped together in a single example for the purpose of streamlining the disclosure.

This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory machine readable medium comprising a plurality of instructions that in response to being executed by a processor of a user equipment (UE), cause the processor to:
   receive downlink control information indicating modulation information for a serving physical downlink shared channel (PDSCH), wherein the serving PDSCH and a co-scheduled PDSCH share same time frequency resources, thereby forming a multiplexed PDSCH;
   determine, for one or more resource blocks (RBs) comprising the multiplexed PDSCH, a first detected power parameter value for the serving PDSCH, based on the modulation information; and
   determine, for the one or more RBs, a second detected power parameter value for the co-scheduled PDSCH, based on the modulation information;
   wherein the modulation information indicates a first modulation order for the serving PDSCH, and wherein, in order to determine the first detected power parameter value for the serving PDSCH, the instructions further cause the processor to:
   detect a composite constellation of the multiplexed PDSCH that includes the serving PDSCH and the co-scheduled PDSCH; and
   match a first assigned power parameter value to the serving PDSCH based on both the indicated first modulation order and the composite constellation;
   wherein, in order to determine the second detected power parameter value for the co-scheduled PDSCH, the instructions further cause the processor to:
   determine a second modulation order for the co-scheduled PDSCH based on the composite constellation and the indicated first modulation order; and
   match a second assigned power offset value to the co-scheduled PDSCH, based on the determined second modulation order.

2. The at least one non-transitory machine readable medium of claim 1, wherein the instructions further cause the processor to demodulate the serving PDSCH based on the first detected power parameter value.

3. The at least one non-transitory machine readable medium of claim 1, wherein the instructions further cause the processor to suppress the co-scheduled PDSCH based on the second detected power parameter value to reduce interference caused by the co-scheduled PDSCH transmitted by an evolved Node B (eNB) via use of the same time and frequency resources as used for the serving PDSCH.

4. An apparatus for a user equipment (UE) comprising:
   a memory; and
   a processor coupled to the memory and configured to executed instructions stored in the memory to cause the UE to:
   receive downlink control information indicating modulation information for a serving physical downlink shared channel (PDSCH), wherein the serving PDSCH and a co-scheduled PDSCH share same time frequency resources, thereby forming a multiplexed PDSCH;
   determine, for one or more resource blocks (RBs) comprising the multiplexed PDSCH, a first detected power parameter value for the serving PDSCH, based on the modulation information; and
   determine, for the one or more RBs, a second detected power parameter value for the co-scheduled PDSCH, based on the modulation information;
   wherein the modulation information indicates a first modulation order for the serving PDSCH, and wherein, in order to determine the first detected power parameter value for the serving PDSCH, the processor is further configured to:
   detect a composite constellation of the multiplexed PDSCH that includes the serving PDSCH and the co-scheduled PDSCH; and
   match a first assigned power parameter value to the serving PDSCH based on both the indicated first modulation order and the composite constellation;
   wherein, in order to determine the second detected power parameter value for the co-scheduled PDSCH, the processor is further configured to:
   determine a second modulation order for the co-scheduled PDSCH based on the composite constellation and the indicated first modulation order; and
   match a second assigned power offset value to the co-scheduled PDSCH, based on the determined second modulation order.

5. The apparatus of claim 4, wherein the processor further causes the UE to demodulate the serving PDSCH based on the first detected power parameter value.

6. The apparatus of claim 4, wherein the processor further causes the UE to suppress the co-scheduled PDSCH based on the second detected power parameter value to reduce interference caused by the co-scheduled PDSCH transmitted by an evolved Node B (eNB) via use of the same time and frequency resources as used for the serving PDSCH.

7. A method for a user equipment (UE) comprising:
receiving downlink control information indicating modulation information for a serving physical downlink shared channel (PDSCH), wherein the serving PDSCH and a co-scheduled PDSCH share same time frequency resources, thereby forming a multiplexed PDSCH;
determining, for one or more resource blocks (RBs) comprising the multiplexed PDSCH, a first detected power parameter value for the serving PDSCH, based on the modulation information; and
determining, for the one or more RBs, a second detected power parameter value for the co-scheduled PDSCH, based on the modulation information;
wherein the modulation information indicates a first modulation order for the serving PDSCH, and wherein, in order to determine the first detected power parameter value for the serving PDSCH, the method further comprises:
detecting a composite constellation of the multiplexed PDSCH that includes the serving PDSCH and the co-scheduled PDSCH; and
matching a first assigned power parameter value to the serving PDSCH based on both the indicated first modulation order and the composite constellation;
wherein, in order to determine the second detected power parameter value for the co-scheduled PDSCH, the method further comprises:
determining a second modulation order for the co-scheduled PDSCH based on the composite constellation and the indicated first modulation order; and
matching a second assigned power offset value to the co-scheduled PDSCH, based on the determined second modulation order.

8. The method of claim 7, further comprising demodulating the serving PDSCH based on the first detected power parameter value.

9. The method of claim 7, wherein the method further comprises suppressing the co-scheduled PDSCH based on the second detected power parameter value to reduce interference caused by the co-scheduled PDSCH transmitted by an evolved Node B (eNB) via use of the same time and frequency resources as used for the serving PDSCH.

10. An apparatus for a base station comprising:
a memory; and
a processor coupled to the memory and configured to execute instructions stored in the memory to cause the base station to:
send, to a user equipment (UE), downlink control information indicating modulation information for a serving physical downlink shared channel (PDSCH), wherein the serving PDSCH and a co-scheduled PDSCH share same time frequency resources, thereby forming a multiplexed PDSCH; and
cause data to be transmitted via the serving PDSCH to the UE, the UE to determine:
for one or more resource blocks (RBs) comprising the multiplexed PDSCH, a first detected power parameter value for the serving PDSCH, based on the modulation information;
for the one or more RBs comprising the multiplexed PDSCH, a second detected power parameter value for the co-scheduled PDSCH, based on the modulation information;
wherein the modulation information indicates a first modulation order for the serving PDSCH, and wherein, in order to determine the first detected power parameter value for the serving PDSCH, the UE is to:
detect a composite constellation of the multiplexed PDSCH that includes the serving PDSCH and the co-scheduled PDSCH; and
match a first assigned power parameter value to the serving PDSCH based on both the indicated first modulation order and the composite constellation;
wherein, in order to determine the second detected power parameter for the co-scheduled PDSCH, the UE is to:
determine a second modulation order for the co-scheduled PDSCH based on the composite constellation and the indicated first modulation order; and
match a second assigned power offset value to the co-scheduled PDSCH, based on the determined second modulation order.

11. The apparatus of claim 10, wherein the UE is further to:
demodulate the serving PDSCH based on the first detected power parameter value.

12. The apparatus of claim 10, wherein the UE is further to:
suppress the co-scheduled PDSCH based on the second detected power parameter value to reduce interference caused by the co-scheduled PDSCH transmitted by an evolved Node B (eNB) via use of the same time and frequency resources as used for the serving PDSCH.

* * * * *